United States Patent [19]

Müller et al.

[11] 4,392,999
[45] Jul. 12, 1983

[54] MONOAZO PIGMENTS CONTAINING HYDROXYNAPHTHOYLAMINO BENZIMIDAZOLONE RADICAL

[75] Inventors: Rolf Müller, Aesch; Armand Rouèche, Bottmingen; Paul Müller, Basel; Karl Ronco, Richen, all of Switzerland

[73] Assignee: Ciba-Geigy Corporation, Ardsley, N.Y.

[21] Appl. No.: 301,807

[22] Filed: Sep. 14, 1981

Related U.S. Application Data

[63] Continuation of Ser. No. 147,817, May 8, 1980, abandoned, which is a continuation of Ser. No. 911,002, May 30, 1978, Pat. No. 4,229,344.

[30] Foreign Application Priority Data

Jun. 3, 1977 [CH] Switzerland ............... 6868/77

[51] Int. Cl.³ .................. C09B 29/36; C09B 43/12; D06P 1/52; D06P 1/649
[52] U.S. Cl. .................... 260/157; 106/23; 106/288 Q; 106/300; 106/308 Q; 106/309; 260/208
[58] Field of Search ....................... 260/157

[56] References Cited

U.S. PATENT DOCUMENTS

| 3,118,870 | 1/1964 | Dietz et al. | 260/154 |
| 3,124,565 | 3/1964 | Schilling et al. | 260/157 |
| 3,137,686 | 6/1964 | Dietz et al. | 260/157 |
| 3,609,913 | 9/1971 | Mory | 260/157 X |
| 3,684,792 | 8/1972 | Mueller | 260/155 |
| 3,849,394 | 11/1974 | Roueche et al. | 260/155 |

FOREIGN PATENT DOCUMENTS

| 1215839 | 5/1966 | Fed. Rep. of Germany | 260/157 |
| 1923256 | 11/1970 | Fed. Rep. of Germany | 260/157 |
| 1374713 | 11/1974 | United Kingdom | 260/157 |

Primary Examiner—Floyd D. Higel
Attorney, Agent, or Firm—Harry Falber

[57] ABSTRACT

The instant invention relates to monoazo pigments containing a hydroxynaphthoylaminobenzimidazolone radical which correspond to the formula

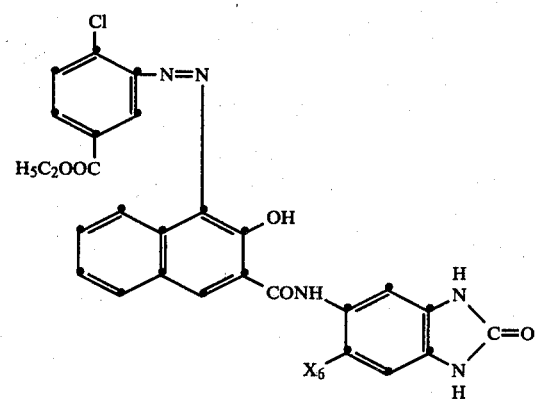

said new pigments being useful for coloring high molecular materials in orange to brown shades of especially good fastness properties.

3 Claims, No Drawings

MONOAZO PIGMENTS CONTAINING HYDROXYNAPHTHOYLAMINO BENZIMIDAZOLONE RADICAL

This is a continuation of application Ser. No. 147,817 filed on May 8, 1980, now abandoned which in turn is a continuation of application Ser. No. 911,002, filed May 30, 1978, now U.S. Pat. No. 4,229,344, issued Oct. 21, 1980.

The present invention relates to valuable new moneazo pigments of the formula I

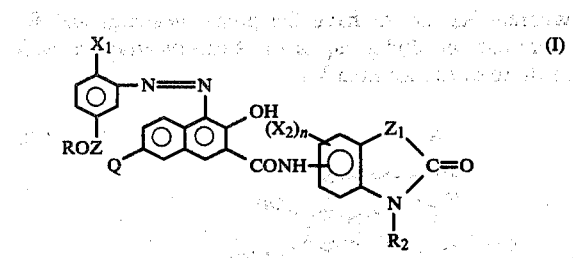

wherein
Z represents a —CO— or —SO$_2$—group,
Q represents a hydrogen atom, a bromine atom or a methoxy group,
R repreents an alkyl group of 1 to 4 carbon atoms which is unsubstituted or substituted by a chlorine atom or an alkoxy group of 1 to 4 carbon atoms, or represents a group of the formula

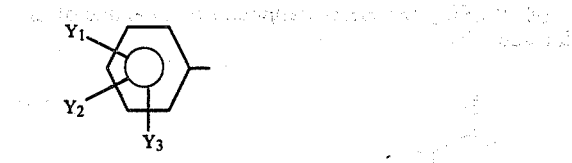

wherein
$Y_1$ represents a hydrogen or chlorine atom, an alkyl or alkoxy group of 1 to 4 carbon atoms,
$Y_2$ and $Y_3$, each independently of the other, represents a hydrogen or chlorine atom, a trifluoromethyl group, an alkyl or alkoxy group of 1 to 4 carbon atoms, an alkanoylamino group of 2 to 4 carbon atoms or the group —COOR$_1$, wherein
$R_1$ represents an alkyl group of 1 to 4 carbon atoms which is unsubstituted or substituted by halogen atoms or alkoxy groups of 1 to 4 carbon atoms; a cycloalkyl group of 5 to 6 carbon atoms, a benzyl group, or a phenyl group which is unsubstituted or substituted by halogen atoms or alkyl or alkoxy groups of 1 to 4 carbon atoms, or
$Y_2$ and $Y_3$ together represent a fused benzene ring which is unsubstituted or substituted by chlorine,
$X_1$ represents a hydrogen or chlorine atom, an alkyl or alkoxy group of 1 to 4 carbon atoms, an alkoxycarbonyl group of 2 to 4 carbon atoms or a phenoxy group,
$R_2$ represents a hydrogen atom, an alkyl group of 1 to 4 carbon atoms or a phenyl radical which is unsubstituted or substituted by halogen atoms, alkyl or alkoxy groups of 1 to 4 carbon atoms.
$X_2$ represents a hydrogen or halogen atom, an alkyl or alkoxy group of 1 to 4 carbon atoms or a phenoxy group,
n is 1 or 2, and
$Z_1$ represents a group of the formula —OCH$_2$—,

—CONH— or —NH—, with the proviso that, if $R_2$ represents alkyl or phenyl, at least one of the symbols $Y_1$, $Y_2$ or $Y_3$ may not represent hydrogen, and if R represents alkyl, $R_2$ must represent hydrogen.

Alkyl group substituents are for example methyl, ethyl, n-propyl, isopropyl, n-butyl, sec-butyl or tert-butyl, but preferably methyl or ethyl.

Alkoxy group substituents are for example, methoxy, ethoxy, n-propoxy, isopropoxy, n-butoxy or tert-butoxy, but especially methoxy and ethoxy.

An alkoxycarbonyl group $X_1$ is for example a methoxy-carbonyl, ethoxycarbonyl, n-propoxycarbonyl or isopropoxycarbonyl group, but preferably a methoxycarbonyl group.

An alkanoylamino group represented by $Y_2$ and $Y_3$ is for example an acetylamino, propionylamino, n-butyrylamino or isobutyrylamino group, but preferably the acetylamino group.

A chloroalkyl group R is a chloroalkyl group containing 1 or 2 chlorine atoms and 1 to 4 carbon atoms, for example chloromethyl, chloroethyl, chloro-n-propyl, chloroisopropyl, chloro-n-butyl, chloro-tert-butyl, dichloroethyl, dichloropropyl, dichloro-n-butyl, but especially chloroethyl and chloro-n-propyl.

The alkoxy moiety of an alkoxyalkyl group R can contain 1 to 4 carbon atoms, for example in methoxyethyl, ethoxyethyl, propoxyethyl, isopropoxyethyl, n-butoxyethyl, tert-butoxyethyl, and the alkyl moiety is in particular ethyl. Such a group is preferably methoxyethyl or ethoxyethyl.

A cycloalkyl group $R_1$ is for example a cyclopentyl group, but is especially a cyclohexyl group.

A substituted phenyl group $R_1$ is for example mono-, di- or trichlorophenyl, tolyl, xylyl, or mesitilenyl, ethylphenyl, tert-butylphenyl, diethylphenyl, triethylphenyl, methoxyphenyl, dimethoxyphenyl, trimethoxyphenyl, ethoxyphenyl, propoxyphenyl, methoxycarbenylphenyl, ethoxycarbonylphenyl, dimethoxycarbonylphenyl, acetylaminophenyl, propionylaminophenyl, isobutyrylaminophenyl, and the substituents are especially in the ortho- or para-position and, in the case of monosubstituted phenyl, preferably in the para-position. A substituted phenyl group $R_1$ is preferably p-chlorophenyl or p-tolyl.

A substituted phenyl radical $R_2$ is for example mono-di- or trichlorophenyl, toyl, xylyl or mesityl, ethylphenyl, tert-butylphenyl, diethylphenyl, triethylphenyl, methoxyphenyl, dimethoxyphenyl, trimethoxyphenyl, ethoxyphenyl, propoxyphenyl, and the substituents are especially in the ortho- and para-position and, in the case of monosubstituted phenyl, preferably in the para-position. A substituted phenyl group $R_2$ is preferably p-chlorophenyl or p-tolyl.

Particularly interesting monoazo pigments are these of the formula II

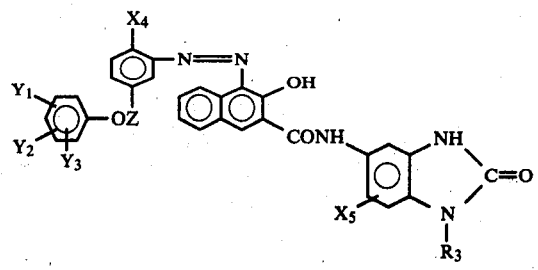

wherein

Z, $Y_1$, $Y_2$ and $Y_3$ have the above meanings, $R_3$ represents hydrogen or methyl, $X_4$ represents chlorine, methyl, methoxy, methoxycarbonyl or ethoxycarbonyl, and $X_5$ represents hydrogen, chlorine, methyl or methoxy, with the proviso that, if $R_3$ is methyl, at least one of the symbols $Y_1$, $Y_2$ or $Y_3$ may not represent hydrogen.

Particularly preferred monoazo pigments are those of the formula III

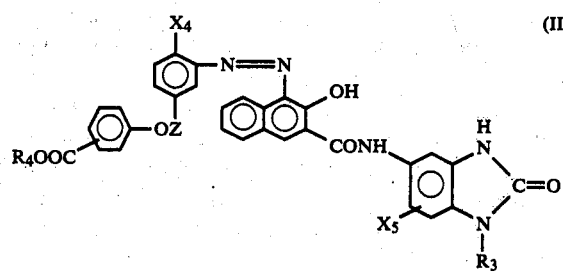

wherein $R_3$, $X_4$, $X_5$ and Z have the above meanings and $R_4$ represents an alkyl group of 1 to 4 carbon atoms, a benzyl group, or a phenyl group which is unsubstituted or substituted by chlorine atoms or alkyl or alkoxy groups of 1 to 4 carbon atoms.

Preferred monoazo pigments are also those of the formula IV

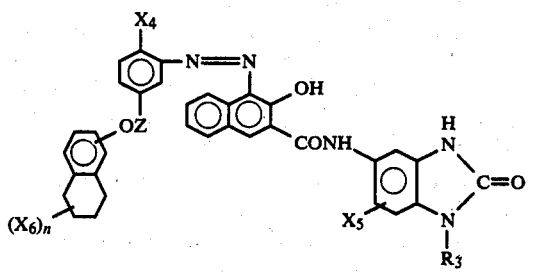

wherein $R_3$, $X_4$, $X_5$, Z and n have the above meanings and $X_6$ represents a hydrogen or chlorine atom.

Particularly interesting monoazo pigments are also those of the formula V

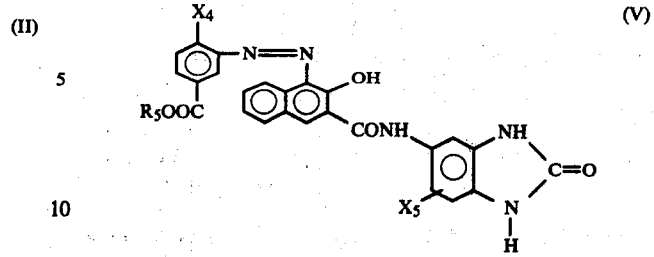

wherein $X_4$ and $X_5$ have the given meanings and $R_5$ represents an alkyl group of 1 to 4 carbon atoms, as well as those of the formula VI

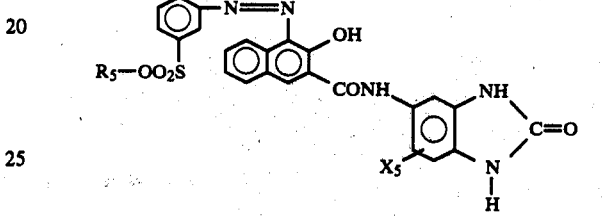

wherein $R_5$ and $X_5$ have the given meanings and $X_7$ represents methyl or methoxy.

The monoazo pigments of the formula I are obtained by (a) coupling the diazo compound of an amine of the formula VII

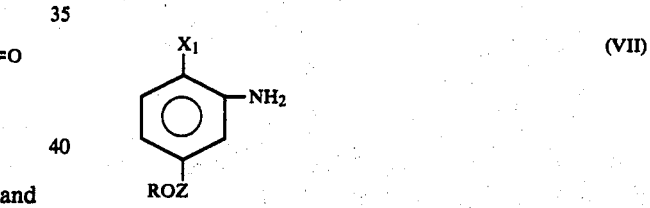

wherein R, Z and $X_1$ have the above meanings, with a naphthoic arylide of the formula VIII

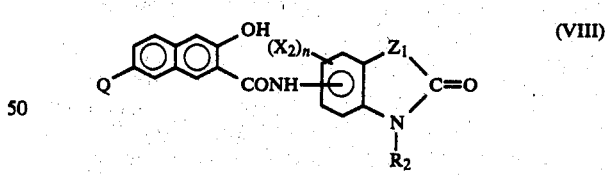

wherein Q, $R_2$, $Z_1$ and $X_2$ have the above meanings, or (b) condensing an azocarboxylic halide of the formula 14

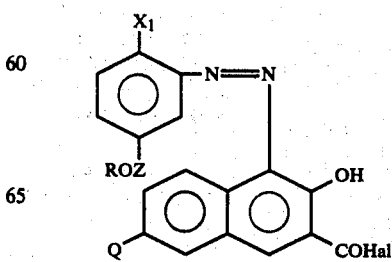

wherein Q, R, Z and $X_1$ have the above meanings, with an amine of the formula X

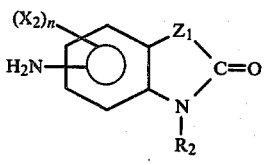

wherein $R_2$, $Z_1$ and $X_2$ have the above meanings.

Examples of diazo components are:
1amino-2chlorobenzene-5-carboxylic acid 4'-methylphenyl ester
1-amino-2-methoxybenzene-5-carboxylic acid 4'-methylphenyl ester
1-amino-2-methylbenzene-5-carboxylic acid phenyl ester
1-amino-2-methylbenzene-5-carboxylic acid 2'-chlorophenyl ester
1-amino-2-methylbenzene-5-carboxylic acid 4'-chlorophenyl ester
1-amino-2-methylbenzene-5-carboxylic acid 2',4'-dichlorophenyl ester
1-amino-2-methylbenzene-5-carboxylic acid 2',4',5'-trichlorophenyl ester
1-amino-2-chlorobenzene-5-carboxylic acid 2'-methylphenyl ester
1-amino-2-methoxybenzene-5-carboxylic acid 4'-methylphenyl ester
1-amino-2-chlorobenzene-5-carboxylic acid 4'-phenylphenyl ester
1-amino-2-methylbenzene-5-carboxylic acid 4'-methoxyphenyl ester
1-amino-2-methylbenzene-5-carboxylic acid 4'-chloro-2'-methylphenyl ester
1-amino-2-methylbenzene-5-carboxylic acid 4'-chloro-3'-methylphenyl ester
1-amino-2-methylbenzene-5-carboxylic acid 4'-isobutyl-phenyl ester
1-amino-2-methylbenzene-5-carboxylic acid 3'-trifluoromethylphenyl ester
1-amino-2-methylbenzene-5-carboxylic acid 2'-chloroethyl ester
1-amino-chlorobenzene-5-carboxylic acid 2'-chloroethyl ester
2-amino-terephthalic acid diphenyl ester
3-amino-isophthalic acid diphenyl ester
1-amino-2-chlorobenzene-5-carboxylic acid 4'-chlorophenyl ester
1-amino-2-chlorobenzene-5-carboxylic acid β-naphthyl ester
1-amino-2-methoxybenzene-5-carboxylic acid 4'chlorophenyl ester
1-amino-2-methoxybenzene-5-carboxylic acid 4'-methoxyphenyl ester
1-amino-2-phenoxybenzene-5-carboxylic acid 4'methylphenyl ester
1-amino-2-chlorobenzene-5-sulphonic acid 4'methylphenyl ester
1-amino-2-methylbenzene-5-sulphonic acid 4'chlorophenyl ester
1-amino-2-methylbenzene-5-sulphonic acid 4'-methylphenyl ester
1-amino-2-chlorobenzene-5-sulphonic acid phenyl ester
1-amino-2-methylbenzene-5-sulphonic acid phenyl ester
1-amino-2-methoxybenzene-5-sulphonic acid phenyl ester
3-amino-4-chlorobenzoic acid methyl ester
3-amino-4-chlorobenzoic acid ethyl ester
3-amino-4-methylbenzoic acid ethyl ester
3-amino-4-methylbenzoic acid isopropyl ester
3-amino-4-methylbenzoic acid β-chloroethyl ester
3-amino-4-methoxybenzoic acid methyl ester
aminoterephthalic acid dimethyl ester
aminoterephthalic acid diethyl ester
4-methyl-3-aminobenzoic acid 4'-methoxycarbonylphenyl ester
4-chloro-3-aminobenzoic acid 4'-methoxycarbonylphenyl ester
4-methoxy-3-aminobenzoic acid 4'-methoxycarbonylphenyl ester
4-phenoxy-3-aminobenzoic acid 4'-methoxycarbonylphenyl ester
4-methyl-3-aminobenzoic acid 3'-methoxycarbonylphenyl ester
4-chloro-3-aminobenzoic acid 3'-methoxycarbonylphenyl ester
4-phenoxy-3-aminobenzoic acid 3'-methoxycarbonylphenyl ester
4-methyl-3-aminobenzoic acid 4'-ethoxycarboxylphenyl ester
4-methoxy-3-aminobenzoic acid 3'-ethoxycarboxylphenyl ester
4-methyl-3-aminobenzoic acid 3'-ethoxycarbonylphenyl ester
4-methyl-3-aminobenzoic acid 4'-n-propoxycarbonylphenyl ester
4-methyl-3-aminobenzoic acid 3'-a-propoxycarbonylphenyl ester
4-methyl-3-aminobenzoic acid 4'-isopropoxycarbonylphenyl ester
4-methyl-3-aminobenzoic acid 3'-isopropoxycarbonylphenyl ester
4-chloro-3-aminobenzoic acid 4'-isopropoxycarbonylphenyl ester
4-methoxy-3-aminobenzoic acid 4'-isopropoxycarbonylphenyl ester
4-methyl-3-aminobenzoic acid 4'-benzyloxycarbonylphenyl ester
4-methyl-3-aminobenzoic acid 4'-βchloroethoxycarbonylphenyl ester
4-methyl-3-aminobenzoic acid 3'-β-chloroethoxycarbonylphenyl ester
4-methyl-3-aminobenzoic acid 4'-n-butoxycarbonylphenyl ester
4-methyl-3-aminobenzoic acid 4'-isobutoxycarbonylphenyl ester.

The amines of the formula VII are advantageously obtained by condensation of a nitrobenzoyl chloride or a nitrobenzenesulphonyl chloride of the formula

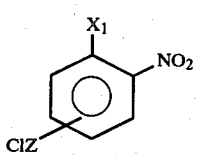

wherein $X_1$ and Z have the given meanings, with a compound of the formula

HOR wherein R has the given meaning and reduction of the resulting nitro ester to give the aminobephoxylate or aminobenzenesulphonate. A catalytic reduction is preferably carried out.

The aminobenzenecarboxylates or aminobenzenesulphonotes are diazotised and coupled with the naphthalic arylides of the formula VIII.

The coupling components of the general formula VIII can be prepared by known methods, for example by reacting 2oxy-3-naphthoic chloride with the corresponding amines. Examples of such amines are:
5-amino-benzimidazolone
5-amino-1-methyl-benzimidazolone
5-amino-1-n-butyl-benzimidazolone
5-amino-1-phenyl-benzimidazolone
5-amino-1-p-chlorophenyl-benzimidazolone
5-amino-1-p-methylphenyl-benzimidazolone
5-amino-1-p-methoxyphenyl-benzimidazolone
5-amino-6-chloro-benzimidazolone
5-amino-6-bromo-benzimidazolone
5-amino-6-methyl-benzimidazolone
5-amino-6-methoxy-benzimidazolone
6-amino-2,4-dihydroxyquinazoline
7-amino-phenmorpholone-3
6-amino-phenmorpholone-3
7-amino-6-chloro-phenmorpholone-3
7-amino-6-methyl-phenmorpholone-3
7-amino-6-methoxy-phenmorpholone-3
6-amino-4-methyl-quinolone-2
7-amino-4-methyl-quinolone-2
7-amino-4,6-dimethyl-quinolone-2
6-amino-7-chloro-4-quinolone-2
7-amino-4-methyl-6-methoxy-quinolone-2

The cited heterocyclic compounds are known compounds. The diazetisation is carried out by known methods.

The coupling preferably takes place in a weakly acid medium, advantageously in the presence of conventional agents that promote the coupling. As such coupling promoters there may be mentioned in particular dispersants, for example aralkylsulphonates, such as dodecylbenzenesulphonate, or 1,1'-dinaphthylmethane-2,2'-disulphonic acid or polycondensation products of alkylene oxides. The dispersion of the coupling component can also advantageously contain protective colloids, for example methylcellulose or minor amounts of inert organic solvents which are sparingly soluble or insoluble in water, for example optionally halogenated or nitrated aromatic hydrocarbons, for example, benzene, toluene, xylene, chlorobenzene, dichlorobenzene or nitrobenzene, and also aliphatic halogenated hydrocarbons, for example, carbon tetrachloride or trichloroethylene, and furthermore water-miscible organic solvents, for example acetone, methyl ethyl ketone, methanol, ethanol or isopropanol, or preferably dimethyl formamide.

The coupling can also advantageously be carried out by continuously combining an acid solution of the diazonium salt with an alkaline solution of the the coupling component in a mixing nozzle, whereupon an immediate coupling of the component occurs. Care must be taken that the diazo component and the coupling component are present in equimolecular amounts in the mixing nozzle, and a slight excess of coupling component proves to be advantageous. This is most simply achieved by controlling the pH of the liquid in the mixing nozzle. Furthermore, intense turbulent mixing of the two solutions in the mixing nozzle must be ensured.

The resultant colourant dispersion is continuously drawn off from the mixing nozzle and the colourant separated by filtration.

Finally, the coupling can also be carried out by suspending the amine to be diazotised with the coupling component in the molar ratio 1:1 in an organic solvent and treating the coupling mixture with a diazotising agent, in particular an ester of nitrous acid, such as methyl, ethyl, butyl, amyl or octyl nitrite.

The azocarboxylic acid on which the halide of the formula IX is based is obtained by coupling the diazo compound of an amine of the formula X with a hydroxynaphthole acid of the formula

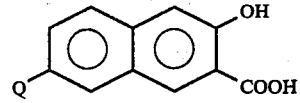

The resultant azo dyestuff carboxylic acids are treated with agents which are capable of converting carboxylic acids into their halides, for example the chlorides or bromides, in particular with phosphorus halides, such as phosphorus pentachloride or phosphorus trichloride or pentabromide,phosphoroxy halides and preferably with thionyl chloride.

The treatment with such acid halogenating agents is preferably carried out in inert organic solvents, such as dimethyl formamide, chlorobenzenes, for example mono- or dichlorobenzene, toluene, xylene or nitrobenzene. In the case of these five last mentioned solvents, dimethyl formamide is optionally added.

In the preparation of the carboxylic acid halides, it is usually advantageous to dry the azo compounds obtained in aqueous medium beforehand or to free them from water azeotropically by boiling them in an organic solvent. The azeotropic drying can be carried out, if desired, directly before the treatment with the acid halogenating agents.

The condensation between the carboxylic acid halides of the kind mentioned at the outset and the aromatic diamines is expediently carried out in anhydrous medium. Under this condition, the condensation takes place as a rule with surprising ease at temperatures which lie in the boiling range of the normal organic solvents, for example, toluene, monochlorobenzene, dichlorobenzene, trichlorobenzene or nitrobenzene. In order to hasten the reaction it is in general advisable to use an acid acceptor, for example anhydrous sodium acetate or pyridine. The resulting pigments are partly crystalline and partly amorphous and are obtained in most cases in very good yield and in a pure state. It is advisable to first precipitate the acid chlorides obtained from the carboxylic acids. In many cases, however, precipitation of the acid chloride can without detriment be dispensed with and the condensation carried out directly after the manufacture of the carboxylic acid chlorides.

The pigments of the present invention can be used partly as crude products. If desired, however, the crude products can be converted into a finely dispersed form by grinding or kneading, advantageously using grinding assistants, such as inorganic and/or organic salts in the presence or absence of organic solvents. After the grinding procedure, the assistants are removed in the conventional manner: soluble inorganic salts for example with water, and water-insoluble assistants for example by steam distillation. The properties of the crude pigments can often be improved by treating them with organic solvents, preferably those having a boiling point above 100° C. Particularly suitable organic solvents are benzenes which are substituted by halogen atoms, alkyl or nitro groups, for example xylenes, chlorobenzene, o-dichlorobenzene or nitrobenzene, as well as pyridine bases, such as pyridine, picoline or quinoline, and also ketones, for example, cyclohexamene; ethers, for example ethylene glycol monomethyl or monoethyl ether; amides, such as dimethyl formamide or N-methylpyrrolidone, as well as dimethyl sulphoxide, sulpholane or water alone, with or without pressure. The aftertreatment can also be carried out in water in the presence of organic solvents and/or with the addition of surface-active substances.

The aftertreatment is effected preferably by heating the pigment in the solvent to 100° to 200° C., whereupon in certain cases an increase in the granular size and, in appropriate circumstances, a change in the crystal modification, occurs. The fastness to light and migration of the resultant pigments are thereby favourably influenced.

The pigments obtained according to the invention are suitable for colouring organic material of high molecular weight of natural or synthetic origin. Such material can comprise for example natural resins, drying oils or rubber. However, it can also comprise modified natural materials, for example chlorinated rubber, oil-modified alkyd resins or viscose or cellulose derivatives, such as acetyl cellulose and nitrocellulose, and in particular man-made organic polyplastics, that is to say, plastics which are obtained by polymerisation, polycondensation and polyaddition. The following products may be mentioned in particular as belonging to this class of plastics: polyethylene, polypropylene, polyisobutylene, polystyrene, polyvinyl chloride, polyvinyl acetate, polyacrylonitrile, polyacrylates, polymethacrylates, polyesters, in particular esters of high molecular weight of aromatic polycarboxylic acids and polyfunctional alcohols; polyamides, the condensation products of formaldehyde and phenols (phenolic plastics), and the condensation products of formaldehyde and urea, thiourea and malamine (aminoplasts); the polyesters used as varnish gums, namely both saturated polyesters, for example alkyd resins, and unsaturated polyesters, for example maleic resins, and also the polyaddition and polycondensation products of epichlorohydrin and polyols or polyphenols known as epoxide resins: in addition thermoplasts, i.e. the non-curable polyplastics. It must be emphasised that not only the homogeneous compounds can be pigmented according to the invention, but also mixtures of polyplastics, as well as co-condensates and copolymers, for example those based on butadiene.

The pigments of the present invention are particularly suitable for colouring polyplastics, such as the film formers or binders known as vehicles, especially for colouring boiled linseed oil, altrocellulose, alkyd resins, malamine resins and ure-formaldehyde resins. The pigmenting of the organic substances of high molecular weight with the pigments of the formula (I) is effected for example by mixing such a pigment, optionally in the form of master-batches, with these substrates using roll mills, mixing or grinding devices. The pigmented material is thereafter brought into the desired final form by known processes, such as calendering, pressing, extruding, coating, casting, or by injection moulding. It is often desirable to add plasticisers to the compound of high molecular weight before forming them in order to obtain non-rigid moulded articles or to diminish their brittleness. Examples of such plasticisers are esters of phosphoric acid, phthalic acid or sebacic acid. The plasticisers can be added in the process of the invention before or after the incorporation of the pigment dye in the polyplastics. In order to obtain different shades it is also possible to add, in addition to the compounds of the formula (I), fillers or other colouring constituents, such as white, coloured or black pigments, in any amounts to the organic substances.

For pigmenting lacquers and printing inks, the organic materials of high molecular weight and the compounds of the formula (I), optionally together with additives, such as fillers, other pigments, siccatives or plasticisers, are finely dispersed or dissolved in a joint organic solvent or solvent mixture. The procedure can consist for example in dispersing or dissolving each of the components individually or also several jointly, and only thereafter combining all the components.

The pigmented organic materials of high molecular weight contain normally amounts from 0.001 to 30% by weight of a compound of the formula (I), based on the organic substance of high molecular weight to be pigmented, Polyplastics and lacquers contain preferably 0.1 to 5% by weight, and printing inks contain preferably 10 to 30% by weight. The amount of pigment to be chosen depends primarily on the desired colour strength, on the layer thickness of the moulded article, and finally also on the content of white pigment, if any, in the polyplastic.

The colourants of the present invention are distinguished by their easy accessibility, and by their good fastness to heat, light, overstripe bleeding, migration and good resistance to atmospheric influences. In spite of the high molecular weight of the diazo bases, and in comparison to diazo bases of lower molecular weight, the pigments of the present invention have a high colour strength.

Compared with similar pigments described for example in German Auslegeschrift 1,816,990 and German Offenlegungsschrift 1,644,226, the pigments of the present invention are distinguished by better light fastness and fastness to atmospheric influences.

In the following Examples which illustrate the invention the parts and percentages are by weight unless otherwise stated.

EXAMPLE 1

31.3 parts of 4-methyl-3-aminobenzoic acid 4'-propoxycarbonylphenyl ester are stirred at room temperature in 200 parts by volume of glacial acetic acid. After about 5 minutes, 25 parts by volume of concentrated hydrochloric acid are added to the completely clear solution. The solution is cooled to 0° C. with ice, treated at 0°-5° C. with 25.5 parts by volume of 4 N sodium nitrite solution over the course of 15 minutes, and then diluted with 150 parts by volume of ice-water. After stirring for about 1 hour at 0°-5° C., excess nitrite is completely destroyed with sulphamic acid and the reaction mixture is then filtered clear. 31.9 parts of 5-(2'-hydroxy-3'-naphthoylamino)-benzimidazolone are dissolved at room temperature in 20 parts by volume of 30% sodium hydroxide solution and 350 parts by volume of water. Two parts of Hyflo are then added to the solution, which is subsequently filtered clear. To the coupling solution are then added 7.5 parts by volume of 30% hydrochloric acid and then, in addition, 20 parts of calcined sodium carbonate. The diazo solution is added to the coupling component at 15°–20° C. in the course of about 30 minutes. When the addition of diazo solution is complete, the pH falls from 12.2 to 3.9. The batch is stirred for 6 to 8 hours at 20°–25° C., then heated to 80° C. The pigment is filtered off hot, washed with hot water and then with cold isopropanol. The filtered cake is dried in vacuo at 70°–80° C., affording 50 parts (97.5% of theory) of a reddish brown powder of the formula

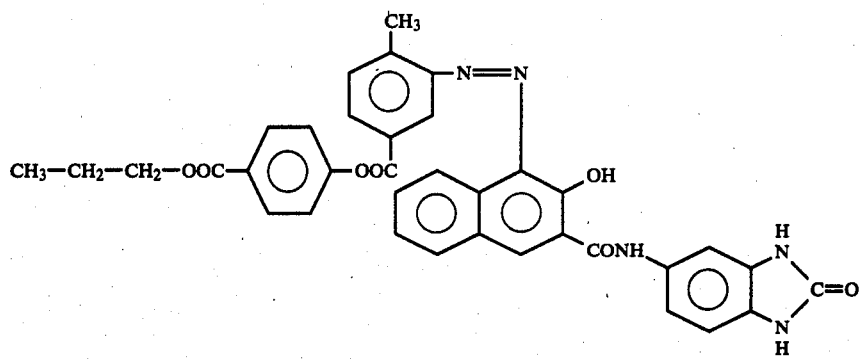

which colours PVC in red shades.

A change in crystal modification occurs after an aftertreatment in dimethyl formamide or N-methyl-2-pyrrolidone (30 minutes at boiling temperature), yielding a pigment which colours PVC in a bright, red shade of very good fastness to migration and light and very good resistance to atmospheric influences. The same results are also obtained by heating the crude pigment for 6 hours in water with 1% of a condensation product of 20 moles of ethylene oxide and 1 mole of oleyl alcohol, at 150° C. under pressure.

Table 1 lists further pigments which are obtained by coupling the diazo compound of the amine of column I with the 2-hydroxy-3-napthoic arylide compound of column II and by a subsequent aftertreatment in the solvent indicated in column IV. Column III indicates the shade in which PVC is coloured with 0.2% of these pigments. The abbreviations NMP and DMFA in column IV denote N-methyl-2-pyrrolidone and dimethyl formamide respectively.

TABLE 1

| Example | Diazo component | Coupling component | Shade | Solvent |
|---|---|---|---|---|
| 2 | 3-amino-4-methoxybenzoic acid 3'-isopropoxycarbonylphenyl ester | 5-(2'-hydroxy-3'-naphthoyl-amino)-benzimidazolone | red | DMFA |
| 3 | 3-amino-4-chlorobenzoic acid 4'-isopropoxycarbonyl phenyl ester | 5-(2'-hydroxy-3'-naphthoyl-amino)-benzimidazolone | reddish brown | DMFA |
| 4 | 3-amino-4-methylbenzoic acid α-naphthyl ester | 5-(2'-hydroxy-3'-naphthoyl-amino)-benzimidazolone | violet brown | NMP |
| 5 | 3-amino-4-methylbenzoic acid β-chloroethyl ester | 5-(2'-hydroxy-3'-naphthoyl-amino)-benzimidazolone | red | NMP |
| 6 | 3-amino-4-methylbenzoic acid 4'-chlorophenyl ester | 5-(2'-hydroxy-3'-naphthoyl-amino)-benzimidazolone | red | NMP |
| 7 | 3-amino-4-methylbenzoic acid 4'-propoxycarbonylphenyl ester | 5-(2'-hydroxy-39-naphthoyl-amino)-6-chlorobenzimidazolone | red | NMP |
| 8 | 3-amino-4-methoxybenzoic acid 3-isopropoxycarbonylphenyl ester | 5-(2'-hydroxy-39-naphthoyl-amino)-6-chlorobenzimidazolone | red | NMP |
| 9 | 3-amino-4-chlorobenzoic acid 4'-isopropoxycarbonylphenyl ester | 5-(2'-hydroxy-39-naphthoyl-amino)-6-chlorobenzimidazolone | red | DMFA |
| 10 | 3-amino-4-methylbenzoic acid α-naphthyl ester | 5-(2'-hydroxy-39-naphthoyl-amino)-6-chlorobenzimidazolone | red | NMP |
| 11 | 3-amino-4-methylbenzoic acid β-chloroethyl ester | 5-(2'-hydroxy-39-naphthoyl-amino)-6-chlorobenzimidazolone | red | NMP |
| 12 | 3-amino-4-methylbenzoic acid 4'-chlorophenyl ester | 5-(2'-hydroxy-39-naphthoyl-amino)-6-chlorobenzimidazolone | red | NMP |
| 13 | 3-amino-4-methylbenzoic acid 4'-propoxycarbonylphenyl ester | 5-(2'-hydroxy-3'enaphthoyl-amino)-6-methylbenzimidazolone | red | NMP |
| 14 | 3-amino-4-methoxybenzoic acid 3'-isopropoxycarbonylphenyl ester | 5-(2'-hydroxy-3'-naphthoyl-amino)-6-methylbenzimidazolone | violet brown | NMP |
| 15 | 3-amino-4-chlorobenzoic acid 4'-isopropoxycarbonylphenyl ester | 5-(2'-hydroxy-3'-naphthoyl-amino)-6-methylbenzimidazolone | reddish brown | NMP |
| 16 | 3-amino-4-methylbenzoic acid β-chloroethyl ester | 5-(2'-hydroxy-3'-naphthoyl-amino)-6-methylbenzimidazolone | red | NMP |
| 17 | 3-amino-4-methylbenzoic acid 4'- | 5-(2'-hydroxy-3'-naphthoyl- | red | NMP |

TABLE 1-continued

| Example | Diazo component | Coupling component | Shade | Solvent |
|---|---|---|---|---|
| | chlorophenyl ester | amino)-6-methylbenzimidazolone | | |
| 18 | 3-amino-4-methylbenzoic acid 4'-propoxycarbonylphenyl ester | 1-N—methyl-3-(2'-hydroxy-3'-naphthoylamino)-benzimidazolone | red | DMFA |
| 19 | 3-amino-4-methoxybenzoic acid 3'-isopropoxycarbonylphenyl ester | 1-N—methyl-3-(2'-hydroxy-3'-naphthoylamino)-benzimidazolone | red | DMFA |
| 20 | 3-amino-4-chlorobenzoic acid 4'-isopropoxycarbonylphenyl ester | 1-N—methyl-3-(2'-hydroxy-3'-naphthoylamino)-benzimidazolone | red | DMFA |
| 21 | 3-amino-4-methylbenzoic acid β-chloroethyl ester | 1-N—methyl-3-(2'-hydroxy-3'-naphthoylamino)-benzimidazolone | red | DMFA |
| 22 | 3-amino-4-methylbenzoic acid 4'-chlorophenyl ester | 1-N—methyl-3-(2'-hydroxy-3'-naphthoylamino)-benzimidazolone | red | NMP |
| 23 | 3-amino-4-methylbenzoic acid isopropyl ester | 3-(2'-hydroxy-3'-naphthoylamino)-benzimidazolone | red | NMP |
| 24 | 3-amino-4-methylbenzoic acid | 5-(2'-hydroxy-3'-naphthoylamino)-6-chlorobenzimidazolone | red | NMP |
| 25 | 3-amino-4-methylbenzoic acid | 5-(2'-hydroxy-3'-naphthoylamino)-6-methylbenzimidazolone | red | DMFA |
| 26 | 3-amino-4-methylbenzoic acid | 1-N—methyl-3-(2'-hydroxy-3'-naphthoylamino)-benzimidazolone | red | DMFA |

EXAMPLE 27

15.4 parts of the azo dye obtained from diazotised 4-methyl-3-aminobenzoic acid 4'-propoxycarbonylphenyl ester and 2-hydroxy-3-naphthoic acid are suspended in 50 parts of o-dichlorobenzene. 5 parts of thienyl chloride and 0.05 part of pyridine are added to the mixture, which is heated to 95° C. and stirred for 1½ hours at 95°–100° C. The crystalline compound is filtered cold by suction and dried in vacuo at 70°–75° C., affording 14 parts of the azocarboxylic chloride of the formula

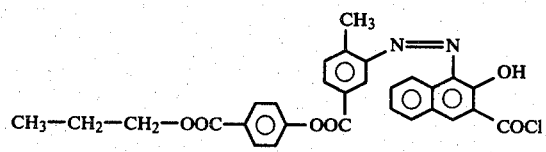

5.31 parts of the above acid chloride are heated, with stirring, in 100 parts of o-dichlorobenzene to 110°–120° C. Then a warm solution of 100° C. containing 1.6 parts of 5-aminobenzimidoxolene in 10 parts of N-methyl-2-pyrrolidone and 25 parts of o-dichlorobenzene is added in the course of 2 to 3 minutes. The precipitated pigment is stirred for 16 hours at 140°–145° C. The reaction mixture is filtered hot, and the filter cake is washed with hot o-dichlorobenzene, then with methanol and finally with water, then dried in vacuo at 60°–70° C., affording 4.3 parts of a soft-grained brown pigment powder which colours plastics, for example polyvinyl chloride, as well as lacquers, in red shades of excellent fastness to migration, overstripe bleeding and light. The pigment dye has the following structural formula

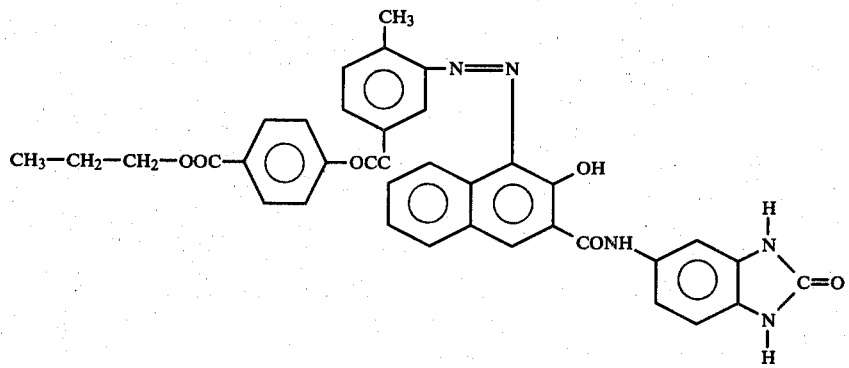

Table 2 lists further acid amide derivatives of azo dyes which are obtained by condensing, in accordance with the particulars of this Example, 1 molecule of the acid chloride of the azo compound of the diazo component in column I and of the coupling component listed in column II with 1 mole of the amine in column III. Column IV indicates the shade of a polyvinyl chloride sheet coloured with the corresponding pigment.

TABLE 2

| Example | I | II | III | IV |
|---|---|---|---|---|
| 28 | 3-amino-4-methylbenzoic acid 4'-propoxycarbonylphenyl ester | 2,3-hydroxy-naphthoic acid | 4-methyl-7,8-benzo-6-aminoquinolene-(2) | bluish red |
| 29 | 3-amino-4-methylbenzoic acid 4'-propoxycarbonylphenyl ester | 2,3-hydroxy-naphthoic acid | 5-amino-6-methoxy-benzimidazolone | reddish brown |
| 30 | 3-amino-4-methylbenzoic acid 4'-propoxycarbonylphenyl ester | 2,3-hydroxy-naphthoic acid | 5-amino-6-ethoxy-benzimidazolone | reddish brown |
| 31 | 3-amino-4-methylbenzoic acid 4'-propoxycarbonylphenyl ester | 2,3-hydroxy-naphthoic acid | 5-amino-7-methyl-benzimidazolone | red |
| 32 | 3-amino-4-methylbenzoic acid 4'-propoxycarbonylphenyl ester | 2,3-hydroxy-naphthoic acid | 1-N—ethyl-5-amino-benzimidazolone | red |
| 33 | 3-amino-4-methylbenzoic acid 4'-propoxycarbonylphenyl ester | 2,3-hydroxy-naphthoic acid | 1-N—propyl-5-amino-benzimidazolone | red |
| 34 | 3-amino-4-methylbenzoic acid 4'-chlorophenyl ester | 2,3-hydroxy-naphthoic acid | 7-amino-6-chlorophen-morpholene-(3) | red |
| 35 | 3-amino-4-methylbenzoic acid 4'-chlorophenyl ester | 2,3-hydroxy-naphthoic acid | 7-amino-6-methylphen-morpholene-(3) | reddish brown |
| 36 | 2-amino-benzoic acid 4'-chlorophenyl ester | 2,3-hydroxy-naphthoic acid | 5-aminobenzimidazolone | red |
| 37 | 3-amino-4-chlorobenzoic acid propyl ester | 2,3-hydroxy-naphthoic acid | 5-amino-6-chloro-benzimidazolone | brown |
| 38 | 3-amino-4-chlorobenzoic acid propyl ester | 2,3-hydroxy-naphthoic acid | 5-aminobenzimidazolone | brown |
| 39 | 3-amino-4-methoxybenzoic acid propyl ester | 2,3-hydroxy-naphthoic acid | 5-aminobenzimidazolone | red |
| 40 | 3-amino-4-methoxybenzoic acid propyl ester | 2,3-hydroxy-naphthoic acid | 5-amino-6-chloro-benzimidazolone | red |
| 41 | 3-amino-4-methylbenzoic acid propyl ester | 2,3-hydroxy-naphthoic acid | 5-amino-benzimida-zolone | red |
| 42 | 3-amino-4-methylbenzoic acid n-butyl ester | 2,3-hydroxy-naphthoic acid | 5-amino-6-methyl-benzimidazolone | bluish red |
| 43 | 3-amino-4-methoxybenzene-sulphonic acid 4'-chloro-phenyl ester | 2,3-hydroxy-naphthoic acid | 5-amino-benzimida-zolone | red |
| 44 | 3-amino-4-methoxybenzene-sulphonic acid 4'-chloro-phenyl ester | 2,3-hydroxy-naphthoic acid | 5-amino-6-chloro-benzimidazolone | red |
| 45 | 3-amino-4-methoxybenzene-sulphonic acid 4'-chloro-phenyl ester | 2,3-hydroxy-naphthoic acid | 7-amino-6-methyl-phenmorpholene-(3) | red |
| 46 | 3-amino-4-methoxybenzene-sulphonic acid 4'-methyl-phenyl ester | 2,3-hydroxy-naphthoic acid | 5-amino-benzimida-zolone | red |
| 47 | 3-amino-4-methoxybenzene-sulphonic acid 4'-methyl-phenyl ester | 2,3-hydroxy-naphthoic acid | 5-amino-6-chloro-benzimidazolone | red |
| 48 | 3-amino-4-methoxybenzene-sulphonic acid 4'-methoxy-phenyl ester | 2,3-hydroxy-naphthoic acid | 5-amino-benzimida-zolone | red |
| 49 | 3-amino-4-methoxybenzene-sulphonic acid 4'-methoxy-phenyl ester | 2,3-hydroxy-naphthoic acid | 5-amino-6-methyl-benzimidazolone | red |
| 50 | 3-amino-4-methoxybenzene-sulphonic acid 4'-methoxy-phenyl ester | 2,3-hydroxy-naphthoic acid | 5-amino-6-methoxybenz-imidazolone | reddish brown |
| 51 | 4-chloro-3-aminobenzoic acid 3',5'-dimethylphenyl ester | 2,3-hydroxy-naphthoic acid | 5-aminobenzimidazolone | reddish brown |
| 52 | 4-chloro-3-aminobenzoic acid 3',5'-dimethylphenyl ester | 2,3-hydroxy-naphthoic acid | 6-methyl-5-amino-benzimidazolone | reddish brown |
| 53 | 4-chloro-3-aminobenzoic acid 3',5'-dimethylphenyl ester | 2,3-hydroxy-naphthoic acid | 6-methoxy-5-amino-benzimidazolone | brown |
| 54 | 4-chloro-3-aminobenzoic acid 3',5'-dimethylphenyl ester | 2,3-hydroxy-naphthoic acid | 5-amino-1-methyl-benzimidazolone | red |
| 55 | 4-chloro-3-aminobenzoic acid 3',5'-dimethylphenyl ester | 2,3-hydroxy-naphthoic acid | 7-amino-6-methyl-phenmorpholene-3 | red |
| 56 | 4-methoxy-3-aminobenzoic acid β-chloroethyl ester | 2,3-hydroxy-naphthoic acid | 5-aminobenzimidazolone | bluish red |
| 57 | 4-methoxy-3-aminobenzoic acid β-chloroethyl ester | 2,3-hydroxy-naphthoic acid | 6-chloro-5-aminobenz-imidazolone | bluish red |
| 58 | 4-methoxy-3-aminobenzoic acid β-chloroethyl ester | 2,3-hydroxy-naphthoic acid | 6-methyl-5-aminobenz-imidazolone | bluish red |
| 59 | 4-(4'-chlorophenoxy)-3-amino-benzoic acid 4-chlorophenyl ester | 2,3-hydroxy-naphthoic acid | 5-aminobenzimidazolone | red |
| 60 | 4-(4'-chlorophenoxy)-3-amino- | 2,3-hydroxy- | 5-amino-1-methyl- | red |

TABLE 2-continued

| Example | I | II | III | IV |
|---|---|---|---|---|
| | benzoic acid 4″-chlorophenyl ester | naphthoic acid | benzimidazolone | |
| 61 | 4-methoxy-3-aminobenzoic acid 3′,5′-dichlorophenyl ester | 2,3-hydroxy-naphthoic acid | 5-aminobenzimidazolone | red |
| 62 | 2-aminoterephthalic acid dimethyl ester | 2,3-hydroxy-naphthoic acid | 5-aminobenzimidazolone | brown |
| 63 | 2-aminoterephthalic acid dimethyl ester | 2,3-hydroxy-naphthoic acid | 6-methyl-5-amino-benzimidazolone | brown |
| 64 | 4-methyl-3-aminobenzoic acid 3′,5′-dimethylphenyl ester | 2,3-hydroxy-naphthoic acid | 5-aminobenzoimidazolone | red |
| 65 | 4-methyl-3-aminobenzoic acid 3′,5′-dimethylphenyl ester | 2,3-hydroxy-naphthoic acid | 5-amino-1-methyl-benzimidazolone | red |
| 66 | 4-methyl-3-aminobenzoic acid 3′,5′-dimethylphenyl ester | 2,3-hydroxy-naphthoic acid | 6-methyl-7-amino-phenmorpholene-3 | red |
| 67 | 4-chloro-3-aminobenzoic acid 2-naphthyl ester | 2,3-hydroxy-naphthoic acid | 5-aminobenzimidazolone | brown |
| 68 | 4-chloro-3-aminobenzoic acid 2-naphthyl ester | 2,3-hydroxy-naphthoic acid | 6-methyl-5-aminobenz-imidazolone | reddish brown |
| 69 | 4-chloro-3-aminobenzoic acid 2-naphthyl ester | 2,3-hydroxy-naphthoic acid | 5-aminobenzimidazolone | brown |
| 70 | 4-chloro-3-aminobenzoic acid 2-naphthyl ester | 2,3-hydroxy-naphthoic acid | 5-amino-1-methyl-benzimidazolone | scarlet |
| 71 | 4-methoxy-3-aminobenzoic acid β-phenylethyl ester | 2,3-hydroxy-naphthoic acid | 5-aminobenzimidazolone | red |
| 72 | 4-methoxy-3-aminobenzoic acid 2′,5′-dichlorophenyl ester | 2,3-hydroxy-naphthoic acid | 5-aminobenzimidazolone | bluish red |
| 73 | 4-methoxy-3-aminobenzene sulphonic acid phenyl ester | 2,3-hydroxy-naphthoic acid | 5-aminobenzimidazolone | violet |
| 74 | 4-methoxy-3-aminobenzene sulphonic acid phenyl ester | 6-methoxy-2,3-hydroxynaphthoic acid | 5-aminobenzimidazolone | violet |
| 75 | 3-amino-4-chlorobenzoic acid β-ethoxyethyl ester | 2,3-hydroxy-naphthoic acid | 5-aminobenzimidazolone | brown |
| 76 | 3-amino-4-chlorobenzoic acid β-ethoxyethyl ester | 2,3-hydroxy-naphthoic acid | 5-amino-6-methylbenz-imidazolone | brown |
| 77 | 3-amino-4-chlorobenzoic acid 4′-chlorophenyl ester | 2,3-hydroxy-naphthoic acid | 5-aminobenzimidazolone | red |
| 78 | 3-amino-4-chlorobenzoic acid 4′-chlorophenyl ester | 2,3-hydroxy-naphthoic acid | 5-amino-6-chloro-benzimidazolone | red |
| 79 | 3-amino-4-chlorobenzoic acid 4′-chlorophenyl ester | 2,3-hydroxy-naphthoic acid | 5-amino-6-methyl-benzimidazolone | brown |
| 80 | 3-amino-4-chlorobenzoic acid 4′-chlorophenyl ester | 2,3-hydroxy-naphthoic acid | 4-methyl-6-amino-7-chloroquinolene | red |
| 81 | 3-amino-4-chlorobenzoic acid 4′-chlorophenyl ester | 2,3-hydroxy-naphthoic acid | 7-amino-phenmorpholene-3 | brown |
| 82 | 3-amino-4-methoxybenzoic acid 4′-chlorophenyl ester | 2,3-hydroxy-naphthoic acid | 5-aminobenzimidazolone | red |
| 83 | 3-amino-4-methoxybenzoic acid 4′-chlorophenyl ester | 2,3-hydroxy-naphthoic acid | 5-amino-6-methylbenz-imidazolone | red |
| 84 | 3-amino-benzoic acid phenyl ester | 2,3-hydroxy-naphthoic acid | 5-amino-6-chlorobenz-imidazolone | red |
| 85 | 3-amino-4-methoxybenzoic acid phenyl ester | 2,3-hydroxy-naphthoic acid | 5-aminobenzimidazolone | red |
| 86 | 3-amino-4-methoxybenzoic acid phenyl ester | 2,3-hydroxy-naphthoic acid | 5-amino-6-methylbenz-imidazolone | red |
| 87 | 3-amino-4-methylbenzene-sulphonic acid phenyl ester | 2,3-hydroxy-naphthoic acid | 5-amino-6-chlorobenz-imidazolone | red |
| 88 | 3-amino-4-methylbenzene-sulphonic acid phenyl ester | 2,3-hydroxy-naphthoic acid | 7-amino-6-methyl-phenmorpholene-3 | red |
| 89 | 3-amino-4-methylbenzene-sulphonic acid phenyl ester | 2,3-hydroxy-naphthoic acid | 7-aminophenmorpholene-3 | red |
| 90 | 3-amino-4-methylbenzene-sulphonic acid 4′-chlorophenyl ester | 2,3-hydroxy-naphthoic acid | 5-aminobenzimidazolone | red |
| 91 | 3-amino-4-methylbenzene-sulphonic acid 4′-chlorophenyl ester | 2,3-hydroxy-naphthoic acid | 5-amino-6-chlorobenz-imidazolone | red |
| 92 | 3-amino-4-methylbenzene-sulphonic acid 4′-chlorophenyl ester | 2,3-hydroxy-naphthoic acid | 5-amino-1-methylbenz-imidazolone | red |
| 93 | 3-amino-4-methylbenzene-sulphonic acid 4′-methyl-phenyl ester | 2,3-hydroxy-naphthoic acid | 5-aminobenzimidazolone | red |
| 94 | 3-amino-4-methylbenzene-sulphonic acid 4′-methyl- | 2,3-hydroxy-naphthoic acid | 5-amino-6-chlorobenz-imidazolone | red |

TABLE 2-continued

| Example | I | II | III | IV |
|---|---|---|---|---|
| | phenyl ester | | | |
| 95 | 3-amino-4-methylbenzene-sulphonic acid 4'-methyl-phenyl ester | 2,3-hydroxy-naphthoic acid | 5-amino-6-methylbenz-imidazolone | red |
| 96 | 3-amino-4-chlorobenzoic acid methyl ester | 2,3-hydroxy-naphthoic acid | 5-amino-6-methylbenz-imidazolone | brown |
| 97 | 3-amino-4-chlorobenzoic acid methyl ester | 2,3-hydroxy-naphthoic acid | 5-aminobenzimidazolone | brown |
| 98 | 3-amino-4-chlorobenzoic acid methyl ester | 2,3-hydroxy-naphthoic acid | 5-amino-6-chlorobenz-imidazolone | brown |
| 99 | 3-amino-4-methylbenzoic acid methyl ester | 2,3-hydroxy-naphthoic acid | 5-aminobenzimidazolone | red |
| 100 | 3-amino-4-methylbenzoic acid methyl ester | 2,3-hydroxy-naphthoic acid | 5-amino-6-methoxy-benzimidazolone | claret |
| 101 | 3-amino-4-methoxybenzoic acid methyl ester | 2,3-hydroxy-naphthoic acid | 5-aminobenzimidazolone | red |
| 102 | 3-amino-4-methoxybenzoic acid methyl ester | 2,3-hydroxy-naphthoic acid | 5-amino-6-methylbenz-imidazolone | red |
| 103 | 3-amino-4-methylbenzoic acid ethyl ester | 2,3-hydroxy-naphthoic acid | 5-amino-6-methylbenz-imidazolone | red |
| 104 | 3-amino-4-methylbenzoic acid ethyl ester | 2,3-hydroxy-naphthoic acid | 5-aminobenzimidazolone | red |
| 105 | 3-amino-4-chlorobenzoic acid ethyl ester | 2,3-hydroxy-naphthoic acid | 5-aminobenzimidazolone | brown |
| 106 | 3-amino-4-chlorobenzoic acid ethyl ester | 2,3-hydroxy-naphthoic acid | 5-amino-6-methylbenz-imidazolone | brown |
| 107 | 3-amino-4-methylbenzoic acid phenyl ester | 2,3-hydroxy-naphthoic acid | 5-aminobenzimidazolone | red |
| 108 | 3-amino-4,6-dichlorobenzoic acid phenyl ester | 2,3-hydroxy-naphthoic acid | 5-aminobenzimidazolone | red |
| 109 | 3-amino-4,6-dichlorobenzoic acid phenyl ester | 2,3-hydroxy-naphthoic acid | 5-amino-6-methyl-benzimidazolone | brown |
| 110 | 3-amino-4-chlorobenzoic acid 4'-carbomethoxyphenyl ester | 2,3-hydroxy-naphthoic acid | 5-amino-6-methyl-benzimidazolone | red |
| 111 | 3-amino-4-chlorobenzoic acid 4'-carbomethoxyphenyl ester | 2,3-hydroxy-naphthoic acid | 5-aminobenzimidazolone | brown |
| 112 | 3-amino-4-chlorobenzoic acid 4'-carbomethoxyphenyl ester | 2,3-hydroxy-naphthoic acid | 5-amino-6-chloro-benzimidazolone | red |
| 113 | 3-amino-4-chlorobenzoic acid 4'-carboethoxyphenyl ester | 2,3-hydroxy-naphthoic acid | 5-amino-6-chloro-benzimidazolone | red |
| 114 | 3-amino-4-chlorobenzoic acid 4'-carboethoxyphenyl ester | 2,3-hydroxy-naphthoic acid | 5-aminobenzimidazolone | brown |
| 115 | 3-amino-4-chlorobenzoic acid 4'-carboethoxyphenyl ester | 2,3-hydroxy-naphthoic acid | 5-amino-1-methylbenz-imidazolone | red |
| 116 | 1-amino-2-methyl-5-benzoic acid β-chloroethyl ester | 2,3-hydroxy-naphthoic acid | 5-aminobenzimidazolone | red |
| 117 | 1-amino-2-methyl-5-benzoic acid β-chloroethyl ester | 2,3-hydroxy-naphthoic acid | 5-amino-6-chloro-benzimidazolone | red |
| 118 | 1-amino-2-methyl-5-benzoic acid β-chloroethyl ester | 2,3-hydroxy-naphthoic acid | 5-amino-6-methylbenz-imidazolone | claret |
| 119 | 1-amino-2-methyl-5-benzoic acid β-chloroethyl ester | 2,3-hydroxy-naphthoic acid | 6-amino-2,4-dioxy-quinazoline | orange |
| 120 | 1-amino-2-methyl-5-benzoic acid β-chloroethyl ester | 2,3-hydroxy-naphthoic acid | 7-amino-6-methyl-phenmorpholene-(3) | claret |
| 121 | 1-amino-2-methyl-5-benzoic acid β-chloroethyl ester | 2,3-hydroxy-naphthoic acid | 4-methyl-6-amino-7-chloroquinolene-2 | orange |
| 122 | 1-amino-2-methyl-5-benzoic acid 4'-methoxyphenyl ester | 2,3-hydroxy-naphthoic acid | 5-aminobenzimidazolone | red |
| 123 | 1-amino-2-methyl-5-benzoic acid 4'-methoxyphenyl ester | 2,3-hydroxy-naphthoic acid | 5-amino-6-chloro-benzimidazolone | red |
| 124 | 1-amino-2-methyl-5-benzoic acid 4'-methoxyphenyl ester | 2,3-hydroxy-naphthoic acid | 5-amino-6-methyl-benzimidazolone | brown |
| 125 | 1-amino-2-methyl-5-benzoic acid 4'-methoxyphenyl ester | 2,3-hydroxy-naphthoic acid | 7-amino-6-methyl-phenmorpholene-(3) | scarlet |
| 126 | 1-amino-2-methyl-5-benzoic acid 3'-trifluoromethyl-phenyl ester | 2,3-hydroxy-naphthoic acid | 3-aminobenzimidazolone | red |
| 127 | 1-amino-2-methyl-5-benzoic acid 3'-trifluoromethyl-phenyl ester | 2,3-hydroxy-naphthoic acid | 5-amino-6-chloro-benzimidazolone | red |
| 128 | 1-amino-2-methyl-5-benzoic acid 3'-trifluoromethyl-phenyl ester | 2,3-hydroxy-naphthoic acid | 5-amino-6-methyl-benzimidazolone | red |
| 129 | 1-amino-2-methyl-5-benzoic acid 3'-trifluoromethyl-phenyl ester | 2,3-hydroxy-naphthoic acid | 5-amino-6-methoxy-benzimidazolone | red |
| 130 | 1-amino-2-methyl-5-benzoic acid 3'-trifluoromethyl-phenyl ester | 2,3-hydroxy-naphthoic acid | 1-methyl-5-amino-benzimidazolone | bluish red |
| 131 | 1-amino-2-methyl-5-benzoic | 2,3-hydroxy- | 7-amino-6-chlorophen- | orange |

TABLE 2-continued

| Example | I | II | III | IV |
|---|---|---|---|---|
| | acid 3'-trifluoromethyl-phenyl ester | naphthoic acid | morpholene-(3) | |
| 132 | 1-amino-2-methyl-5-benzoic acid 3'-trifluoromethyl-phenyl ester | 2,3-hydroxy-naphthoic acid | 7-amino-6-methyl-phen-morpholene-(3) | claret |
| 133 | 1-amino-2-methyl-5-benzoic acid 4'-carbomethoxy-phenyl ester | 2,3-hydroxy-naphthoic acid | 5-aminobenzimidazolone | claret |
| 134 | 1-amino-2-methyl-5-benzoic acid 4'-carbomethoxy-phenyl ester | 2,3-hydroxy-naphthoic acid | 5-amino-6-chlorobenz-imidazolone | claret |
| 135 | 1-amino-2-methyl-5-benzoic acid 4'-carbomethoxy-phenyl ester | 2,3-hydroxy-naphthoic acid | 3-amino-6-ethylbenz-imidazolone | claret |
| 136 | 1-amino-2-methyl-5-benzoic acid 4'-carbomethoxy-phenyl ester | 2,3-hydroxy-naphthoic acid | 5-amino-6-methoxy-benzimidazolone | brown |
| 137 | 1-amino-2-methyl-5-benzoic acid 4'-carbomethoxy-phenyl ester | 2,3-hydroxy-naphthoic acid | 1-Methyl-5-amino-benzimidazolone | bluish red |
| 138 | 1-amino-2-methyl-5-benzoic acid 4'-carbomethoxy-phenyl ester | 2,3-hydroxy-naphthoic acid | 7-amino-6-chlorophen-morpholene-(3) | bluish red |
| 139 | 1-amino-6-methyl-5-benzoic acid 4'-carbomethoxy-phenyl ester | 2,3-hydroxy-naphthoic acid | 7-amino-6-methylphen-morpholene-(3) | claret |
| 140 | 1-amino-2-methyl-5-benzoic acid 4'-carbomethoxy-phenyl ester | 2,3-hydroxy-naphthoic acid | 7-aminophenmorpholene-(3) | bluish red |
| 141 | 1-amino-2-methyl-5-benzoic acid β-naphthyl ester | 2,3-hydroxy-naphthoic acid | 5-aminobenzimidazolone | claret |
| 142 | 1-amino-2-methyl-5-benzoic acid β-naphthyl ester | 2,3-hydroxy-naphthoic acid | 5-amino-6-chloro-benzimidazolone | red |
| 143 | 1-amino-2-methyl-5-benzoic acid ethyl ester | 6-methoxy-2,3-hydroxy-naphthoic acid | 5-aminobenzimidazolone | bluish red |

EXAMPLE 144

0.6 g of the pigment obtained in Example 1 is mixed with 67 g of polyvinyl chloride, 33 g of diestyl phthalate. 2 g of dibutyl tin dilaurate and 2 g of titanium dioxide and the mixture is processed to a thin slick for 15 minutes at 160° C. on a roll mill. The red colouration obtained is strong and fast to migration and light.

EXAMPLE 145

1 g of the pigment obtained in Example 1 is finely ground in an Enselsmann grinding machine with 4 g of a litho varnish of the composition
29.4% of linseed oil-stand oil (300 poise)
67.2% of linseed oil-stand oil (20 poise)
2.1% of cobalt octoate (8% Co) and
1.3% of lead octoate (24% Pb).

Using a stereotype block, this varnish is printed in an amount of 1 g/m² on art paper by letter press printing. A strong, bright, red shade of good transparence and good gloss is obtained.

The pigment is also suitable for other printing methods, such as intaglio printing, offset printing, flexographic printing, with equally good results.

EXAMPLE 146

15 g of collodion cotton containing 35% of butanol, 15 g of a phthalate resin modified with castor oil, 15 g of a 70% butanolic solution of a urea varnish gum, 20 g of butyl acetate, 10 g of glycol monoethyl ether, 20 g of toluene and 5 g of alcohol are processed to a lacquer. This lacquer is then pigmented with 2 g of the colourant of Example 1 and 2 g of titanium dioxide (rutile) and ground. The lacquer is sprayed onto cardboard and dried, giving a red coating of very good fastness to light and overstripe bleeding and very good resistance to atmospheric influences.

EXAMPLE 147

To 100 g of a stoving lacquer consisting of 58.5 g of a 60 % solution of a coconut alkyd resin in xylene, 23 g of a 65% solution of a melamine varnish gum in butanel, 17 g of xylene and 1.5 g of butanol, are added 1 g of the colourant of Example 1 and 5 g of titanium dioxide. The mixture is ground for 48 hours in a ball mill and the pigmented lacquer is sprayed onto a clean metal surface. After stoving at 120° C., a red colouration of good fastness to light and overstripe bleeding and good resistance to atmospheric influences is obtained.

What is claimed is:
1. A monoazo pigment corresponding to the formula

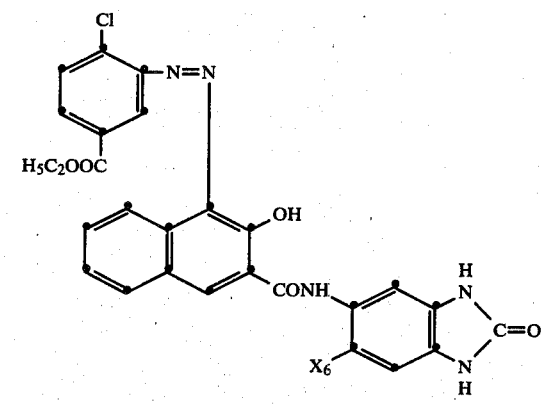

wherein $X_6$ is hydrogen or methyl.
2. The pigment of claim 1, wherein $X_6$ is hydrogen.
3. The pigment of claim 1, wherein $X_6$ is methyl.